United States Patent Office 3,052,659
Patented Sept. 4, 1962

3,052,659
MIXED ACRYLIC POLYMERS CARRYING
GLYCIDYL AND CARBOXYL GROUPS
Howard C. Woodruff, 5008 W. Briar Lane, Apt. 9,
Houston 27, Tex.
No Drawing. Filed Aug. 26, 1959, Ser. No. 836,306
1 Claim. (Cl. 260—80.5)

Molded and cast plastic articles based on styrene and methyl methacrylate are well known for resistance to acids and alkalis as well as known for high impact resistance. The outstanding feature of these plastics however is initial pale color and resistance to discoloration by the action of heat and ultra violet rays.

Since both styrene plastics and acrylate plastics are addition polymers, they remain permanently thermoplastic and are therefore not suitable for baking industrial finishes.

In order to convert styrene and methacrylate plastics into systems suitable for industrial finishing systems which would utilize their advantages, I have found it desirable to incorporate into the chemistry of their structure certain reactive groups which on heating would cause cross linking and convert the plastic from a material softened by heating into a material which would be hardened by heating.

Such coating systems would then possess the advantages of the styrene and methacrylate plastics which are:

(1) Resistance to discoloration on exposure to heat and light.
(2) Resistance to alkali, acid, water and detergents.
(3) Toughness and resistance to scratching and abrasion.
(4) High gloss and high polish.

It is an objective of the present invention to make possible the heat curing the cross linking of styrene, methylmethacrylate and similar addition polymer plastics and thus produce industrial coatings having resistance and durability features heretofore not obtainable.

In the practice of the present invention I cause the polymerization of styrene, methyl-methacrylate and similar plastic monomeric raw materials by the conventional means of peroxide catalysis, however with the unsaturate monomers I use, in combination, certain monomers carrying, in addition to the unsaturation necessary for polymerization, other groups which contribute to the polymer available reactive groups which at the discretion of the user can be caused to react by further heating and convert to a heat-cured system. When such a system is caused to heat cure on the surface of an object and when the system carries a pigment intimately incorporated, outstanding industrial finishes result.

The coatings produced as a result of the carrying out of the present invention are outstanding in adhesive qualities to substrates such as metal, ceramic, glass and plastics.

As indicated above and as is well known in the art, unsaturate monomers such as styrene and methyl methacrylate polymerize by the process of addition to form long chains of numerous monomeric units. The addition reaction is caused to occur by the action of peroxides or other free radical catalysts. In the normal plastics the long chains of monomeric units form the backbone of the structure. In the thermoplastic molding plastics technic no additional reactive sites are necessary or desirable.

In the practice of this invention however into the linear polymer backbone structure chemically reactive sites are incorporated. The further reaction of these chemically reactive groups at the desired time causes cross linking.

The linear addition polymer structure is modified in the practice of the present invention in that the linear addition polymer structure carries pendant on the structure a plurality of each of two distinct types of reactive groups. The two types are capable of reacting with one another under the influence of heat to form a new chemical linkage. By this means the linear polymer is converted to a three dimensional cross linked polymer.

For purposes of simplicity in designation and nomenclature, the doubly reactive linear addition polymer is referred to as DRELAP.

It is readily apparent that a wide variety of monomers may be used to form the DRELAP structures. Dependent on the properties of each of the ingredient monomers, the properties of the final coatings can be regulated within wide limits.

Since a DRELAP consists of at least three different monomers of different function, the three monomer types may be classified as follows:

Type A—A monomer containing an unsaturated ethylenic group, and not a group capable of reaction other than the reaction of addition polymerization.
Type B—A monomer containing an unsaturated ethylenic group capable of linear polymerization and also containing another reactive chemical group in addition to the ethylenic unsaturation.
Type C—A monomer containing an unsaturated ethylenic group capable of linear polymerization and also another reactive chemical group capable of linking with the reactive chemical group of Type B on the application of heat.

In order to specifically point out the various monomers which fall within the three above cited types the following lists are appended in Table I.

TABLE I

*List of Examples of Monomers Occurring Within the Various Types*

| Type | Group | Name | Molecular weight |
|---|---|---|---|
| A | 1 | Methyl Methacrylate | 100.11 |
| | 1 | Butyl Methacrylate | 142.17 |
| | 1 | 2 Ethyl Hexyl Acrylate | |
| | 1 | The Methyl ester of dehydrated castor oil | |
| | 1 | Ethyl Acrylate | 100.11 |
| | 1 | Butyl Acrylate | 128.17 |
| | 2 | Styrene | 104.14 |
| | 2 | Alpha Methyl Styrene | 118.14 |
| | 2 | Vinyl Toluene | 118.14 |
| | 3 | Vinyl Acetate | 86.09 |
| | 3 | Vinyl 2 Ethyl Hexoate | 170.24 |
| | 3 | Vinyl Benzoate | |
| | 3 | Vinyl Toluate | |
| B | 1 | Acrylic Acid | 72.06 |
| | 1 | Methacrylic Acid | 86.06 |
| | 1 | Crotonic Acid | 86.09 |
| | 1 | Cinnamic Acid | |
| | 2 | Allyl Alcohol | 58.08 |
| | 2 | Ortho Allyl Phenol | 134.08 |
| | 2 | Allyl Salicylate | |
| C | 1 | Allyl Glycidyl Ether | 114.10 |
| | 1 | Ortho Allyl Phenyl Glycidyl Ether | 190.14 |

In Table I above each of the monomers falling within Type A, group 3, is intended to represent a vinyl substituted aromatic hydrocarbon. Each of the monomers falling within Type A, group 1, is intended to represent an ethylenic aliphatic acid ester. Each of the monomers falling within Type A, group 2, is intended to represent an ester of an unsaturated aliphatic alcohol. Each of the monomers falling within Type B, group 1, is intended to represent an ethylenic unsaturated aliphatic carboxylic acid. Each of the monomers falling within Type B, group 2, is either an ethylenic aliphatic alcohol or an ethylenic aromatic phenol. Each of the monomers falling within Type C is intended to represent an aliphatic compound carrying at least one ethylenic unsaturated group and at least one oxirane group.

TABLE II

*Preferred Proportions of Ingredients in Mols Composing the DRELAP Systems*

| List Type | Group | DRELAP #1 | DRELAP #2 | DRELAP #3 | DRELAP #4 | DRELAP #5 |
|---|---|---|---|---|---|---|
| A | 1 | 3.0 | 4.0 | 3.0 | 3.0 | 3.0 |
| A | 2 | 6.0 | 5.0 | 6.0 | 6.0 |  |
| A | 3 |  |  |  |  | 6.0 |
| B | 1 | 1.0 | 1.0 | 2.0 |  | 1.0 |
| B | 2 |  |  |  | 0.5 |  |
| C | 1 | 0.5 | 0.5 | 0.5 | 1.5 | 0.5 |
| D |  |  |  | ¹0.5 |  |  |

¹ 0.5 mol of a diepoxide added. System of Example #3 cures by internal cross linking and external cross linking.

Many proportions of ingredients may be used within the scope of the DRELAP system; the preferred amounts are shown in Table II.

In the process of manufacturing the DRELAP resins the monomers are charged into a reactor a suitable solvent added for the purpose of modulating the addition reaction, a peroxide catalyst is added in the range of 0.2 to 2.0% and the mass heated to reaction temperature suitable for addition polymerization but not suitable for cross linking. Such temperatures are in the 200–260° F. range. Cooling is necessary to absorb the exotherm of the reaction. The addition polymerization continues until large molecules are formed at which point the polymerization decreases and a stable solution results. Usually the starting system contains 20–40% solvent such as xylol. The final product, when the reaction is substantially complete, is further diluted to contain 40–60% solvent by weight. It has a viscosity in the range of 1.0–25.0 poises. The thus completed DRELAP is ready to be incorporated into industrial finishes.

The industrial baking finish is made generally as follows from the DRELAP:

The DRELAP is mixed with suitable colorant (white, color pigment, or dyestuff), and ground to assure complete dispersion. Suitable solvents are added to adjust the working viscosity to spraying, dipping, or roller coat application conditions.

A catalyst may then be added. The function of such catalyst is to accelerate the reactions causing the cross linking. Generally a tertiary nitrogen containing catalyst is preferred. Examples of catalysts of this type are triethanolamine, trimethylamine, dimethylaniline, dimethylaminomethyl phenol, 1,4 bis (2 hydroxy propyl) 2 methyl piperazine.

$C_6H_5CH_2N(CH_3)_2$ benzyl trimethylamine
$C_6H_5CH_2CHOHCH_2\text{—}N(CH_3)_2$
$C_6H_5OCH_2CHOHCH_2N(CH_2CH_3)_2$

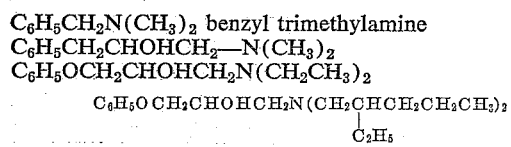

Menthane diamine (1,8 diamine-p-menthane)

The catalyst may be present in amounts of 0.01 to 0.5% based on the total weight of the system.

The coating material prepared as above described is applied to an article to be coated by spraying or other means and thereafter the coating is cured by heating the entire article in an oven maintained at 225–375° F. The exposure to this temperature from 10 minutes to 40 minutes is sufficient to cure the coating on the article. The coatings thus produced are tough, resistant, adhesive, and color stable.

It is apparent that the system of the present invention is of wide versatility and scope. No limitation is intended in connection with the molal ratios of ingredients, particularly those of the cross linking type.

When desirable a DRELAP may be formed using an excess of an ethylenic monomer carrying acid groups. The DRELAP thus formed may be used in a coating system in conjunction with an additional polyepoxide material. Such polyepoxide material being added to the system prior to application as a coating. The system represented by DRELAP No. 3 of Table II accordingly utilizes such multiple curing mechanics.

As polyepoxides suitable for use as described immediately above, I refer to any organic compound carrying more than one epoxy group. Among such materials are:

Resorcinol di glycidyl ether,
Bis phenol diglycidyl ether,
Poly allyl glycidyl ether,
Diphenylol methane diglycidyl ether,
Resinous products derived by reacting bis-phenol-di-glycidyl-ether with bis phenol,
Cyclopentadiene dioxide,
3,4 epoxy-6-methyl cyclohexyl methal-3,4 epoxy-6-methyl cyclohexanecarboxylate otherwise known as Epoxide 201,
Dipentene dioxide,
Vinyl cyclohexane dioxide,
Bis epoxydicyclopentyl ether of ethylene glycol,
Epoxidized unsaturated fatty acid ester,
Epoxidized alkyd resins.

The heat curing addition polymers resulting from the practice of the present invention are of a wide range of compatibility and miscibility and within the scope of this invention may be used in mixture with other film forming materials. Among such film forming materials are:

Akyld resins
Rosin esters
Cellulose esters
Melamine-formaldehyde resins
Urea-formaldehyde resins
Ketone-aldehyde resins
Triglyceride oils
Vinyl resins
Oleoresinous varnishes
Phenol-aldehyde resins
Triazine-formaldehyde resins

EXAMPLE NO. 1

[In this example a DRELAP is prepared]

*DRELAP NO. 1a*

| Ingredients: | Parts by Weight |
|---|---|
| Butyl methacrylate monomer, 3 mols | 426.51 |
| Vinyl toluene monomer, 6 mols | 708.84 |
| Methacrylic acid monomer, 1 mol | 72.06 |
| Allyl glycidyl ether monomer, .5 mol | 29.04 |
| (Solvent) xylol | 618.22 |
| Benzoyl peroxide (1% on monomers) | 12.36 |
| Cumene hydroperoxide | 12.36 |

Processing: The monomers are mixed in a closed reactor vessel equipped with heating and cooling arrangements, an agitator for mixing the contents of the vessel and a reflux condenser. Xylol is added and the mass heated to 180–200° F. The peroxide catalysts are then added. The reaction will start to occur as evidenced by a developing exotherm. The mass is then cooled so as to maintain the temperature in the range of 220–240° F. The temperature is maintained at 220–240° F. with either heating or cooling. The viscosity of the reacting mass is determined periodically. The viscosity is determined by withdrawing a small amount of the contents of the reactor. This specimen is diluted with xylol until the resulting solution contains 50% xylol and 50% non volatile material by weight. The viscosity in poises is determined on the solution containing 50% non volatile. The viscosity of the reaction mass will be observed to increase. When the viscosity at 50% non volatile falls within the range of 2.0 to 25.0 poises the reaction is considered complete. At this point sufficient xylol is added to the reactor to yield a final product containing solvent xylol 50% by weight and 50% non volatile solids by weight. This product is DRELAP 1–a.

EXAMPLE NO. 2

[In this example a DRELAP is converted into an enamel. The enamel is coated on to metal and the coating cured and tested]

DRELAP Enamel No. 1

Ingredients: Parts by weight
- Resin: DRELAP No. 1–a (Example No. 1) __ 100.0
- Pigment: Pure titanium dioxide _____ 50.0
- Solvent: Solvent xylol _____ 20.0
- Catalyst: Amine-alpha dimethyl benzyl amine 0.5

Processing: The enamel is produced by thoroughly dispersing the pigment in the DRELAP. Then the solvent and catalyst is added. This makes a product suitable for spray coating.

Application: The enamel is applied by a spray gun on to an unprimed steel panel. It is allowed to remain at room temperature 3 to 5 minutes and thereafter placed in an oven maintained at 350° F. for 20 minutes. On removal from the oven the panel contains the white enamel on its surface in the cured form.

For test purposes the enamel is sprayed on a number of different panels including the following:

22 gauge steel panel—unprimed
  22 gauge aluminum panel—unprimed
  Electrolytic tin plate Each panel is cured for 20 minutes in an oven maintained at 350° F.

TESTS ON INDUSTRIAL FINISH—DRELAP ENAMEL NO. 1

Substrate on which film is carried: 22 gauge unprimed steel.
Film thickness tested: 1.0–1.2 mils.
Color of film (visual): White—no yellow apparent.
Gloss of film (measured on 60 degree gloss meter): 89.
Hardness (Rocker hardness compared to glass as 100): 44.
Impact resistance: Withstands 40 inch pounds. Fails at 60 inch pounds.
Resistance to chemical action:
  Distilled water—room temperature: No effect 20 days. Small blisters 25 days.
  5% sodium hydroxide in water (140° F.): No effect 15 days. Small blisters 20 days.
  5% acetic acid (140° F.): No effect 30 days.
  Vinegar (140° F.): No effect 30 days.
  Fatty acids (soya) (140° F.): No effect 5 days. Softened in 10 days.
  3% detergent (140° F.): No effect 12 days. Blisters 18 days.
  Steam at 15 lbs. pressure: No effect 15 minutes. Blisters in 75 minutes.
Distensibility: Passes 200%, fails 230%.
Exposure testing:
  Exposure to heat—temperature 400° F., time: 2 hours.
  Gloss after exposure: 84.
  Color of film after exposure: No change from original.
  Hardness of film after exposure: 52.
  Impact resistance after exposure: Withstands 40 inch pounds.
Exposure to ultra violet light in fadeometer: No change in 500 hours.
Exposure to 5% salt spray: No effect after 800 hours.
Exposure to 98–100% humidity at 100° F.: No effect 1 week; small blisters after 10 days.
Weatherometer exposure:
  No loss of gloss after 300 hours.
  No observable effect on film.

EXAMPLE NO. 3

[In this example a DRELAP is prepared]

DRELAP No. 4–a

Ingredients: Parts by weight
- Methyl methacrylate monomer, 3 mols ____ 300.33
- Styrene monomer, 6 mols _____ 624.48
- Allyl alcohol monomer, .5 mol _____ 29.04
- Allyl glycidyl ether monomer, 1.5 mols ____ 171.15
- Solvent xylol _____ 562.00
- Benzoyl peroxide (1% on the monomers) __ 11.24
- Cumene hydroperoxide (1% on the monomers) _____ 11.24

Processing: The monomers are mixed in a closed reactor vessel equipped with heating and cooling arrangements and an agitator for mixing the contents of the reactor and a reflux condenser. Xylol is added and the mass heated to 180–200° F. The peroxide catalysts are then added. An exotherm occurs. This is regulated by cooling the reactor. Cooling and heating are applied alternately so as to maintain the temperature at 220–240° F. The viscosity of the reacting mass is determined periodically. It is observed that the viscosity of a 50% non volatile solution of the DRELAP gradually increases as the reaction proceeds. When the viscosity at 50% non volatile reaches 14.0–15.0 poises, the reaction is considered complete. At this point the reacting mass is cooled and sufficient solvent xylol added to yield a final product containing 50% by weight non volatile DRELAP and 50% by weight volatile solvent. The product is DRELAP No. 4–a.

EXAMPLE NO. 4

[In this example the DRELAP is converted into an enamel. The enamel is coated on to metal and the coating cured and evaluated]

DRELAP Enamel No. 4–a

Ingredients: Parts by weight
- Resin: DRELAP No. 4–a (Example 3) ____ 100.0
- Pigment: Pure titanium oxide _____ 50.0
- Solvent: Xylol _____ 22.0
- Butanol _____ 5.0
- Catalyst: Benzyl trimethyl amine _____ 0.1

Processing: The pigment is dispersed in the DRELAP No. 4–a by grinding in a pebble mill. The solvent and catalyst is then added to the mill. After mixing is complete the finished enamel is placed in containers.

Application: The enamel is applied by a spray gun on to an unprimed metal panel. It is allowed to remain at room temperature for three to five minutes and thereafter placed in an oven maintained at 350° F. for 30 minutes. On removal from the oven the metal panel carries the white enamel on its surface in the cured form. The properties of the enamel were as follows:

TEST SCHEDULE AND RESULTS

Finish designation: DRELAP Enamel No. 4–a.
Substrate on which film is carried: Unprimed 22 gauge cold rolled steel.
Film thickness tested: 1.0–1.1 mils—
Exposure to 5% salt spray: No change in 500 hours.
Exposure to 98–100% humidity at 100° F.: No effect 14 days. Slight blisters 20 days.
Weatherometer exposure: No loss of gloss after 500 hours. No noticeable effect on film.
Gloss (measured on 60° glossmeter): 96.
Color of film: White.
Hardness (Rocker hardness compared to glass as 100): 57.
Impact resistance: Passes 60 inch pounds.
Distensibility: Passes 400%.
Resistance to chemical action:
  Distilled water: No effect after 31 days.
  5% sodium hydroxide in water (140° F.): No effect after 20 days.
  5% acetic acid (140° F.): No effect after 30 days.
  Vinegar (140° F.): No effect after 7 days.

Fatty acids (soya) (140° F.): No effect after 10 days; softened 14 days.

3% "Tide" detergent (140° F.): No effect in 15 days; softened in 25 days.

Steam at 15 lbs. pressure: No effect in two hours.

Exposure testing:
  Exposure to heat—
    Temperature: 400° F.
    Time: 2 hours.
    Gloss after exposure: 92.
    Color after exposure: No change from original.
    Impact resistance after exposure: Passes 60 inch pounds.

EXAMPLE NO. 5

[In this example the DRELAP is used as a clear coating]

DRELAP Clear Coating No. 4–b

Ingredients: Parts by weight
  DRELAP No. 4–a _____ 200
  Solvent xylol _____ 80
  Dimethyl aniline _____ .2

Process: Mix ingredients. The clear coating was applied by spraying on glass and aluminum panels. The panels were allowed to remain at room temperature 5 to 8 minutes and thereafter placed in an oven maintained at 350° F. for 20 minutes. The properties of the clear coatings were as follows:

TEST SCHEDULE AND RESULTS

| Finish Designation: DRELAP Clear Coating | No. 4-b | No. 4-b |
|---|---|---|
| Substrate on which film is carried | Plate Glass | 22 Ga. Aluminum. |
| Film thickness tested (in mils) | 1.2–1.4 | .4–.5. |
| Gloss (60° gloss meter) | 97 plus | 97 plus. |
| Color of Film | Clear-colorless | Clear-colorless. |
| Hardness (Rocker hardness compared to glass as 100) | 38 | 33. |
| Impact Resistance | Not tested | greater than 80 inch pounds. |
| Adhesion (Knife Test) | Very high | Very high. |
| Resistance to Chemical Action: | | |
| Distilled Water | No effect after 31 days | No effect after 31 days. |
| 5% Sodium Hydroxide in Water | No effect after 30 days | No effect after 30 days. |
| 5% Acetic Acid | ____do____ | Do. |
| Vinegar | ____do____ | Do. |
| Fatty Acids (Soya) | No effect after 15 days | No effect after 15 days. |
| Steam at 15 lbs. pressure | softened after 25 days no effect 2 hours. | softened after 25 days; no effect 2 hours. |

EXPOSURE TESTING

| Exposure to heat— | | |
|---|---|---|
| Temperature | 400° F | 400° F. |
| Time | 4 hours | 4 hours. |
| Gloss after Exposure | 94 | 91. |
| Color after Exposure | no change | no change. |
| Impact resistance after Exposure | not tested | passes 60 in. lbs. |
| Hardness (Rocker Hardness) | 44 | 46. |

EXAMPLE NO. 6

DRELAP No. 5

Ingredients: Parts by weight
  Allyl glycidyl _____ 60
  Methacrylic acid _____ 80
  Ethyl acrylate _____ 180
  Methyl methacrylate _____ 180
  Styrene _____ 500
  Solvent xylol _____ 300
  Benzoyl peroxide _____ 10
  Cumene hydroperoxide _____ 10

Processing: As in Example No. 1. Final product characteristics when diluted to 50% by weight of solid non volatiles in xylol: Viscosity, $Z_2$–$Z_3$.

DRELAP No. 5 was converted into a coating system as follows:

Parts by weight
DRELAP No. 5 _____ 100
Xylol _____ 40
Epoxy resin derived from bis phenol and epichlorhydrin having an epoxy equivalent of 245–255 ____ 8

The coating system was sprayed on metal panels. It cured at 350° F. to form a pale, tough, adhesive film.

EXAMPLE NO. 7

DRELAP No. 6

Ingredients: Parts by weight
  Allyl glycidyl _____ 60
  Methacrylic acid _____ 80
  Allyl alcohol _____ 60
  Ethyl acrylate _____ 120
  Methyl methacrylate _____ 180
  Styrene _____ 500
  Solvent xylol _____ 400
  Cumene hydroperoxide _____ 9

Processing: Same as in Example No. 1. Final product characteristics when diluted to 50% non-volatile in xylol: Viscosity, W.

DRELAP No. 6 was converted into a coating system as follows:

Parts by weight
DRELAP No. 6 _____ 100
Xylol _____ 40
Epoxy resin derived from bis phenol and epichlorhydrin having an epoxy equivalent of 245–255 ____ 7
Melamine-formaldehyde resin—60% non-volatile in xylol butanol solution _____ 12

When the above coating system was applied to metal and cross linked by baking at 350° F. for 30 minutes a tough flexible pale adhesive film resulted which was not effected by overnight immersion in xylol.

EXAMPLE NO. 9

The Epoxide 201 of Example 8 was replaced by an equal weight of resorcinol diglycidyl ether. A coating of excellent quality was obtained.

EXAMPLE NO. 10

The Epoxide 201 of Example 8 was replaced by an equal weight of cyclopentadiene diepoxide. A coating of excellent qualities was obtained.

EXAMPLE NO. 11

The Epoxide 201 of Example 8 was replaced by an equal weight of bis epoxydicyclopentyl ether of ethyleneglycol. A coating of excellent qualities was obtained.

I claim:

A new composition of matter, the linear mixed polymer of:

Parts by weight
Methyl methacrylate _____ 180
Styrene _____ 500
Ethyl acrylate _____ 180
Methacrylic acid _____ 80
Allyl glycidyl ether _____ 60

References Cited in the file of this patent

UNITED STATES PATENTS

| 2,839,514 | Shokal et al. | June 17, 1958 |
| 2,899,404 | Chapin et al. | Aug. 11, 1959 |
| 2,910,459 | Rothrock et al. | Oct. 27, 1959 |
| 2,918,391 | Hornibrook | Dec. 22, 1959 |